Reissued Nov. 30, 1926.

Re. 16,488

UNITED STATES PATENT OFFICE.

LEOTA N. EARL, OF FORT WORTH, TEXAS, ASSIGNOR TO J. R. BROWN AND D. S. DONOVAN, OF DALLAS, TEXAS.

DOUGH AND PROCESS OF MAKING THE SAME.

No Drawing. Original No. 1,563,694, dated December 1, 1925, Serial No. 715,311, filed May 23, 1924. Application for reissue filed October 26, 1926. Serial No. 144,359.

My invention relates to a new article of manufacture and the process of making the same and more particularly to dough for making biscuit and rolls and the like and process of making the same; and the object is to provide dough as an article of commerce which can be transported in intrastate and interstate shipments and to provide a superior article of food which can be kept for several days in stock ready for sale. Other objects and advantages will be fully explained in the following description and the invention will be more particularly pointed out in the claims.

The mixing of the ingredients and the manner of mixing the ingredients require several steps hereinafter set forth.

The composition includes ingredients substantially in the following proportions. Use six pounds of wheat flour. Boil one gallon of sweet milk or water. Scald the flour with one-half of the milk. To the remaining milk, add four pounds of lard, two pounds of sugar, and six ounces of salt. Mix thoroughly. Let it cool, and add to the scalded flour two pounds of mashed potatoes. Mix again.

Next add four cakes of good yeast. Beat well and then place in a warm room for two hours. Obviously this will induce partial fermentation by the yeast and cause the batch to swell or expand.

Next add four tablespoonfuls of baking powder and two tablespoonfuls of soda and mix with the batter so prepared.

Next add enough flour to make dough of the consistency of ordinary biscuit dough. Knead well, and place in a warm room for one hour. Next place the dough in an ice-box or refrigerator for twelve hours for thorough cooling. This cooling or chilling checks further fermentation and maintains the baking powder inert until the dough is about to be baked.

The dough is now ready for use in any way required. For delivery, cut and wrap in oiled paper and place it in boxes ready for market. This dough will keep for several days in a temperature that is adapted for keeping fresh meats. The addition of the proper proportions of baking powder and soda will act as a preservative and the dough will keep sweet for several days so that the dough can be marketed in the unbaked condition.

What is claimed as new is:

1. As an article of manufacture, prepared yeast-fermented dough, composed of ingredients capable of producing an edible product when baked, and including baking powder, the baking powder being present in an inert condition.

2. As an article of manufacture, prepared yeast-fermented baking dough composed of ingredients capable of producing an edible product when baked, and including an acid neutralizing agent and a baking powder, the dough being in a chilled condition whereby further fermentation is checked and the baking powder remains inert.

3. As an article of manufacture, a yeast-fermented baking dough composed of ingredients capable of producing an edible product when baked, partially raised by the action of the ferments, and including baking powder, the dough being in a chilled condition whereby further fermentation is checked and the baking powder remains inert.

4. As an article of manufacture, a yeast-fermented dough composed of ingredients capable of producing an edible product when baked, partially raised by the action of ferments and containing baking powder and an acid neutralizing agent to prevent souring, the dough being in a chilled condition whereby further fermentation is checked and the baking powder remains inert.

5. The process of making yeast-fermented baking dough, which consists in including with the ingredients of the dough, a yeast ferment, inducing fermentation to expand the dough, adding baking powder, and chilling the dough whereby further fermentation is checked and the baking powder remains inert.

6. The process of making yeast-fermented baking dough, which consists in including with the ingredients of the dough a yeast-ferment, inducing fermentation to expand the dough, adding baking powder and an acid neutralizing agent, chilling the dough, whereby further fermentation is checked and the baking powder remains inert.

7. The process of making baking dough which consists in mixing with the ingredients of the dough, including flour, milk, lard, sugar, salt and potatoes, a yeast-ferment, inducing partial fermentation by heating the mixture, adding baking powder and an acid neutralizing agent, chilling the dough, whereby further fermentation is checked, and the baking powder remains inert.

8. The herein described process for making dough which comprises boiling one gallon of milk, mixing one-half of the boiled milk with six pounds of flour and scalding the flour therewith, mixing the other half of the boiled milk with four pounds of lard, two pounds of sugar and four ounces of salt, cooling the last mixture and then adding it to the scalded flour with two pounds of mashed potatoes, then mixing in these ingredients four cakes of yeast and placing in a warm room for two hours, then mixing the batter thus prepared with four tablespoonfuls of baking powder, two tablespoonfuls of soda, next adding enough flour to make dough of the required consistency and kneading well and placing in a warm room for one hour, and then placing in an ice box or refrigerator for twelve hours.

9. An article of manufacture comprising dough made of ingredients and in approximately the following proportions, six pounds of flour, one gallon boiled milk, four pounds of lard, two pounds of sugar, six ounces of salt, two pounds of mashed potatoes, four ounces of yeast, four tablespoonfuls of baking powder, two tablespoonfuls of soda, and enough flour to make dough of the required consistency.

Signed at Texon in the county of Reagan and State of Texas this 21st day of October A. D. 1926.

LEOTA N. EARL.